United States Patent
Goel et al.

(10) Patent No.: US 10,347,244 B2
(45) Date of Patent: Jul. 9, 2019

(54) DIALOGUE SYSTEM INCORPORATING UNIQUE SPEECH TO TEXT CONVERSION METHOD FOR MEANINGFUL DIALOGUE RESPONSE

(71) Applicant: Go-Vivace Inc., McLean, VA (US)

(72) Inventors: Nagendra Kumar Goel, McLean, VA (US); Mousmita Sarma, Assam (IN)

( * ) Notice: Subject to any disclaimer, the term of this patent is extended or adjusted under 35 U.S.C. 154(b) by 0 days.

(21) Appl. No.: 15/494,193

(22) Filed: Apr. 21, 2017

(65) Prior Publication Data

US 2018/0308487 A1    Oct. 25, 2018

(51) Int. Cl.
| | |
|---|---|
| *G10L 15/22* | (2006.01) |
| *G10L 15/26* | (2006.01) |
| *G10L 15/18* | (2013.01) |
| *G10L 17/18* | (2013.01) |
| *G10L 25/63* | (2013.01) |
| *G10L 25/24* | (2013.01) |
| *G10L 15/00* | (2013.01) |
| *G10L 15/02* | (2006.01) |
| *G10L 25/78* | (2013.01) |

(Continued)

(52) U.S. Cl.
CPC ......... *G10L 15/1815* (2013.01); *G10L 15/22* (2013.01); *G10L 15/26* (2013.01); *G10L 17/18* (2013.01); *G10L 15/005* (2013.01); *G10L 15/02* (2013.01); *G10L 17/02* (2013.01); *G10L 25/24* (2013.01); *G10L 25/63* (2013.01); *G10L 25/78* (2013.01); *G10L 25/90* (2013.01); *G10L 2015/223* (2013.01); *G10L 2015/225* (2013.01); *G10L 2015/227* (2013.01)

(58) Field of Classification Search
CPC ................................. G10L 15/22; G10L 15/26
See application file for complete search history.

(56) References Cited

U.S. PATENT DOCUMENTS

| | | |
|---|---|---|
| 7,725,307 B2 | 5/2010 | Bennett |
| 8,965,770 B2 | 2/2015 | Petrushin |
| 2006/0122834 A1 | 6/2006 | Bennett |

(Continued)

OTHER PUBLICATIONS

Ferrer, Luciana, et al. "Study of senone-based deep neural network approaches for spoken language recognition." IEEE/ACM Transactions on Audio, Speech and Language Processing (TASLP) 24.1 (2016): 105-116.*

Hansen, John H. Robust Speech Processing & Recognition: Speaker ID, Language ID, Speech Recognition/Keyword Spotting, Diarization/Co-Channel/Environmental Characterization, Speaker State Assessment. Texas Univ At Dallas Richardson, 2015.*

(Continued)

*Primary Examiner* — Bryan S Blankenagel
(74) *Attorney, Agent, or Firm* — Henry J. Cittone; Cittone Demers & Arneri LLP

(57) ABSTRACT

A real-time dialogue system that provides real-time transcription of the spoken text, with a sub-second delay by keeping track of word timings and word accuracy is provided. The system uses a grammar or a list of keywords to produce the transcripts by using a statistical language model. In addition, the system uses a deep neural network based I-vector system to constantly analyze the audio quality to assess and to identify additional metadata such as gender, language, accent, age, emotion and identity of an end user to enhance the response. The present invention provides a conversational dialogue system, to robustly identify certain specific user commands or intents, while otherwise allowing for a natural conversation, without switching between grammar based and natural language modes.

16 Claims, 10 Drawing Sheets

(51) Int. Cl.
　　　*G10L 17/02*　　　(2013.01)
　　　*G10L 25/90*　　　(2013.01)

(56) References Cited

U.S. PATENT DOCUMENTS

| | | | | |
|---|---|---|---|---|
| 2008/0082963 | A1* | 4/2008 | Muschett | G06F 17/2247 717/114 |
| 2014/0079195 | A1* | 3/2014 | Srivastava | G10L 15/22 379/88.01 |
| 2015/0012464 | A1 | 1/2015 | Gilbert | |
| 2015/0066479 | A1 | 3/2015 | Pasupalak et al. | |
| 2015/0112684 | A1 | 4/2015 | Scheffer et al. | |
| 2015/0149165 | A1 | 5/2015 | Saon | |
| 2015/0154002 | A1* | 6/2015 | Weinstein | G06F 3/167 715/728 |
| 2016/0086607 | A1* | 3/2016 | Aley-Raz | G10L 17/12 704/246 |
| 2017/0105662 | A1* | 4/2017 | Silawan | A61B 5/1171 |
| 2017/0286407 | A1* | 10/2017 | Chochowski | G06F 17/289 |
| 2018/0358005 | A1* | 12/2018 | Tomar | G06F 17/2785 |

OTHER PUBLICATIONS

Sell, Gregory, Daniel Garcia-Romero, and Alan McCree. "Speaker diarization with i-vectors from DNN senone posteriors." Sixteenth Annual Conference of the International Speech Communication Association. 2015.*

Palangi, "Deep sentence embedding using long short-term memory networks: Analysis and application to information retrieval." IEEE/ACM Transactions on Audio, Speech and Language Processing (TASLP) 24(4):P697-707 Apr. 1, 2016.

Richardson, "Deep neural network approaches to speaker and language recognition." IEEE Signal Processing Letters 22(10):1671-1675 Oct. 1, 2015.

Mohanty, "Speaker Identification using SVM during Oriya Speech Recognition." International Journal of Image, Graphics and Signal Processing 7(10):28-36 Sep. 1, 2015.

Dehak, "Front-end factor analysis for speaker verification." IEEE Transactions on Audio, Speech, and Language Processing 19(4):788-798 May 1, 2011.

* cited by examiner

DIALOGUE SYSTEM INCORPORATING UNIQUE SPEECH TO TEXT CONVERSION METHOD FOR MEANINGFUL DIALOGUE RESPONSE

FIELD OF THE INVENTION

The present invention relates to an automatic speech to text conversion apparatus and more particularly, to a dialogue system that uses a unique speech to text method for understanding features and emotional context for a meaningful dialogue and for analyzing dialogue between multiple people and drawing conclusions.

BACKGROUND

Automatic speech to text conversion is often used to replace humans with a machine on another end of a telephone line, or for smart assistants, to create a dialogue system, or to analyze the conversation between several humans. Conventional speech to text systems use different approaches, such as Grammar based, Language model based, N-Best lists, keyword spotting to enhance the accuracy of conversion. In grammar based speech to text conversion system, the vocabulary is limited to smaller set of words and speaker's pre-defined set of sequences usually hand-crafted for specific situations. These grammar based systems utilize several different standards for specifying grammars such as GRXML, JSGF, and ABNF etc. The limitations of using the Grammar based approach is that it is extremely restrictive in terms of permitted user vocabulary as the speaker needs to be aware of the system vocabulary, because any deviation from the specified vocabulary will generally cause transcription errors.

In contrast to the Grammar based system, the language model based speech to text systems support much larger vocabularies derived on the basis of a large corpus of naturally occurring text which may come from book, articles, manual transcription of conversations, websites etc. The language model based speech to text systems model the common occurrence of a user's speech and provide customized conversation by heavily weighting sentences for better understanding of certain domains of the conversation. Despite the ability of such fine tuning, the accuracy of speech to text conversion provided by the language model based speech to text systems is not perfect. A transcription mistake occurred on a word or a phrase may appear very difficult in terms of recovery as the language model based speech to text systems have large vocabulary, and thus it is hard to make a prior list of possible confusions so that a corrective action could be taken while processing the speech to text output. From this perspective the language model based speech to text systems fall behind the grammar based systems in terms of accuracy for the utterances that match the grammar. Another approach used to overcome the limitations associated with the language model based speech to text engine is n-best list in which a list is generally generated that contains different and probably competing transcriptions of a same transcript. However, the n-best lists create a long list of alternate sentences which differ only slightly in regions of utterance that are not even critical for the dialogue. Therefore, the n-best list based systems leave much to be parsed by the text processing system and often still miss the key phrases of interest.

Another approach, mostly implemented in call-center analytics, is a keyword spotting approach that scans an audio for certain keywords and key phrases. This approach provides a decent picture of different incidents of a conversation by identifying the key phrase of content more accurately. However, the remainder of the content is completely missed in this approach. These systems do not attempt to transcribe the speech in real time, but more as a post-processing step where the recorded audio archives are searched.

Therefore, there is a need for an inventive approach that can overcome the limitations associated with conventional speech to text systems. In order to solve the aforementioned problems, the present invention provides a method that allows the speech to text to stay large vocabulary, while at the same time utilizing the grammars and extending the vocabulary and sematic analysis outputs; and a system that implements real-time transcription of the user spoken text by a unique speech to text solution by matching the dialogue to relevant phrases on the fly.

SUMMARY

The present invention provides a unique speech dialogue system that addresses many of the deficiencies of the current solutions. The present invention presents a real-time speech to text system that provides real-time transcripts of spoken texts, with a sub-second delay. It also keeps track of the word timings and word accuracy confidences. In order to allow more sensible dialogue that takes into account the characteristics of the speaker, speaker's age, accent, gender and emotional state are estimated on-the-fly and these become inputs to the dialogue flow.

In the conversation analysis scenario, the aforementioned features become additional inputs to the analysis system, which can be used to discern mockery for example. In the description below, to avoid redundancy, we shall mention dialogue system, while keeping in mind that the same components are also used for conversation analysis, and equivalent applications.

This invention also presents a novel approach to processing traditional ASR grammar files, in order to expand the semantic analysis of those files, to allow processing of phrases that are not specified in the grammar.

In a first aspect of the present invention, a dialogue response system incorporating unique speech to text transcription to understand features and emotional context of a dialogue is provided. The dialogue response system comprises a speech to text engine to convert an input speech of an end user into text in real-time, the text input comprises a sequence of recognized word strings and confusions in text form; a semantic engine configured to receive the sequence of recognized word string (or a word lattice) from said speech to text engine and converting the sequence of recognized word string into one or more low dimensional vector representing the semantic content of the utterance, said semantic engine extracts semantic meaning from the sequence of recognized word string and assigns one or more action tags to the sequence of recognized word string by utilizing a pre-trained knowledge; a query generator configured to map the one or more action tags to one or more database queries present in an interactive workflow logic module, wherein the interactive workflow logic module handles situations arises subsequent to a dialogue response; and a natural language generator trained to receive the mapped one or more action tags and said additional data, wherein the mapped one or more action tags and said additional data are being mapped into one or more logical sentences to form a spoken response of the dialogue system in real-time. The dialogue response system further comprises a text to speech engine for receiving and converting the one or more logical sentences into the spoken response. The semantic engine is designed as LSTM attention neural network for tagging using one hot word embeddings. The semantic engine further comprises a semantic mapper that is configured to label the one or more action tags by including all kinds of possible meaning of a word from the sequence of recognized word string in a particular context.

In a second aspect of the present invention, a method for incorporating unique speech to text transcription to understand speech utterance in a dialogue response, where a grammar based IVR system may have existed before, but an easy migration path to a natural dialogue system is desirable, is provided. This method involves expanding the provided grammars to create a table of possible input phrases or sentences and the corresponding grammar output tags. Then then sentences are added to the vocabulary of the speech to text engine's language model. The neural semantic engine embeddings are already trained on large amounts of data. The table derived from the grammar is used to further train the outputs of the semantic engine to learn the tagging associations. In this process there may be several other sentences or phrases that are not specified in the grammar, but the semantic engine learns how to map those to one of the output tags provided by the grammar because of its prior semantic training.

In a third aspect of the present invention the dialogue response system further comprises of a few subsystems to extract additional metadata like language, accent, age and emotion from the end user's input speech along with end user's identity. The dialogue response system comprises a language/accent recognition subsystem that extracts acoustic features from the input speech of the end user to identify language and/or accent of the end user. The language/accent recognition subsystem comprises a speech activity detection module to detect speech activity; a shifted delta cepstral (SDC) module to compute cepstral mean and variance normalization of the input speech and to produce SDC feature vectors; an I-vector extractor module to receive SDC feature vectors and to produce I-vectors using a deep neural network-universal background model (DNN-UBM); and a logistic regression classifier module to receive and classify the I-vectors in order to identify the end user's language or accent. The dialogue response system further comprises a speaker recognition (SR) subsystem that extracts acoustic features from the input speech of the end user to identify and verify the end user. The speaker recognition subsystem comprises a speech activity detection module to detect speech activity of the end user; an MFCC computation module to calculate Mel Frequency Cepstral Coefficient along with cepstral mean and variance normalization of the speech activity and to generate feature vectors; a keyword spotter module to provide keyword spotting based enrollment and verification of the end user, if opted; a DNN-UBM based I-vector extractor module to produce I-vectors using a DNN-UBM and a probabilistic linear discriminant analysis (PLDA) based classifier module to classify the identity of the end user. The dialogue response system further comprises of an age and emotion identification subsystem to identify age and emotion of the end user's input speech. In order to support different datasets and also different computational and memory requirements the dialogue response system provides two approaches for age and emotion identification. One type of system in both emotion and age is designed following the DNN-UBM and I-vector approach and the other type of system uses a single LSTM-RNN based end to end DNN classifier. The DNN-UBM and I-vector based age and emotion identification subsystem comprises a speech activity detection module to detect speech information and to generate an output for an MFCC computation module; said MFCC computation module performs analysis of the acoustic features followed by cepstral mean and variance normalization of the input speech to identify the age and emotion of the end user; a DNN-UBM based I-vector extractor to generate an I-vector for the identified acoustic features; a logistic regression classifier to classify the I-vectors to identify the end user's age and emotion. The alternate LSTM-RNN based age and emotion identification subsystem comprises a single end to end DNN classifier trained directly using the raw speech waveforms; said end to end classifier has two convolutional layer followed by two Network-in-Network (NIN) layers which performs the role of feature extraction from raw waveforms; the end to end DNN classifiers also has 2 LSTM layers after the feature extraction layers followed by a soft-max layer. The emotion identification subsystem of dialogue response system provides provisions of both discrete and continuous classification of end user's emotional level; said discrete classification of end user's emotion comprises classes like anger, happiness, anxiety, neutral, boredom and sadness; and the continuous classification of end user's emotion provides rating of emotional level in two continuous scale called valence and arousal. The additional metadata thus are generated by the language/accent recognition subsystem, the speaker recognition subsystem and the age and emotion identification subsystem in the form of language, accent, age, emotion and identity of the end user.

BRIEF DESCRIPTION OF DRAWINGS

The preferred embodiment of the invention will hereinafter be described in conjunction with the appended drawings provided to illustrate and not to limit the scope of the invention, wherein like designation denote like element and in which.

DETAILED DESCRIPTION

Figure 1:
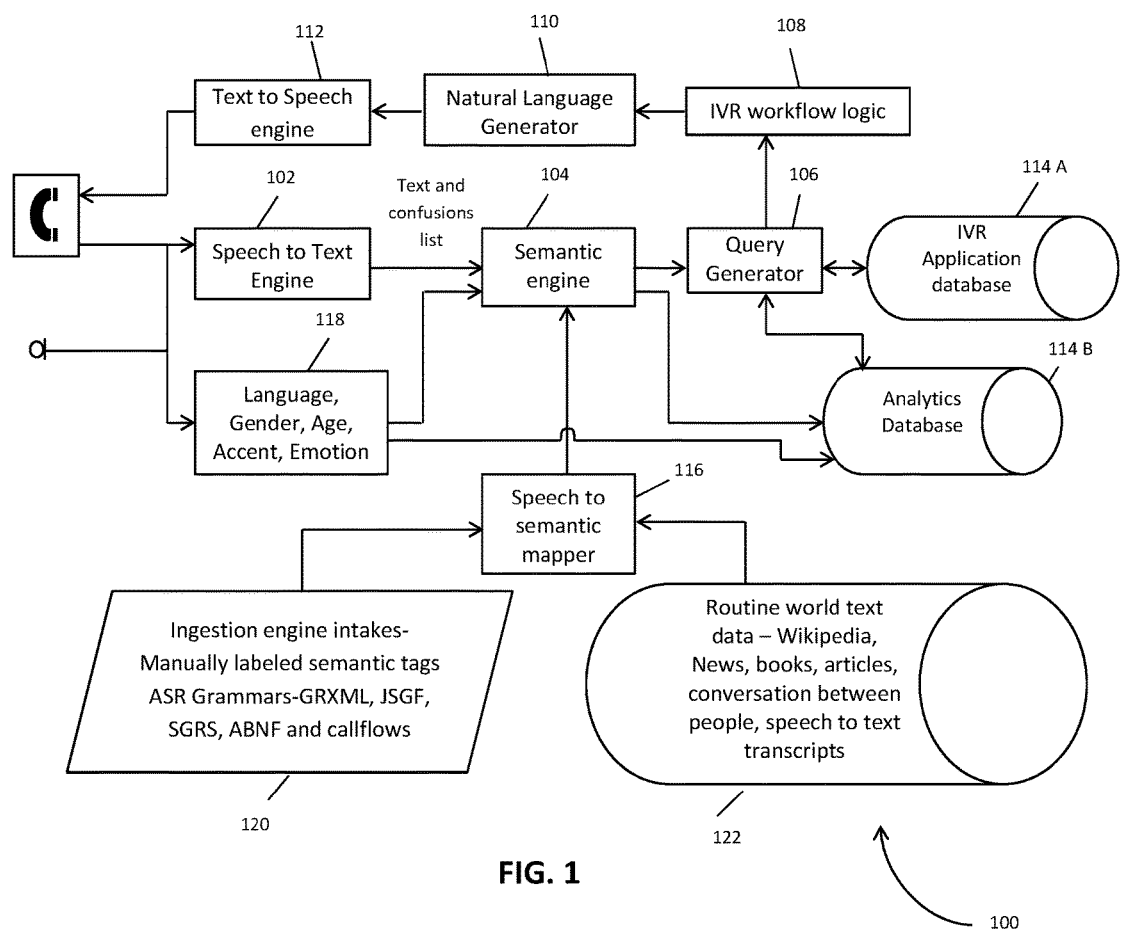
FIG. 1 illustrates a block diagram of a dialogue engine, in accordance with an embodiment of the present invention.

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances, well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

In an embodiment of the present invention, a dialogue system with unique speech to text solution is provided, where the system provides real-time transcription of a spoken text. The system keeps track of word timing and a word confidence score during the transcription process. In addition to producing a transcript using a language model, the proposed system also keeps track of a grammar or a list of keywords defined by the system. While the regular transcript is being produced, the system also matches the utterance of an end user with the grammar or the list of keywords. When the match is established, the system identifies detailed information of the match in a separate entry without interrupting the regular transcription process.

In another embodiment of the present invention, the system constantly analyzes an audio quality of the end user to assess and identify additional metadata from the audio. The additional metadata of the audio may include, but not limited to, a gender, language, accent, age, emotion, identity and the like of the end user. If the end user is new to the system, the system extracts and further stores the identified additional metadata of the particular end user in a database for future usage. The system extracts the additional metadata directly from voice analysis of the end user. If the end user is known to the system, the system utilizes the stored information related to that particular end user to provide better user experience. The output of the system is presented in one of the easily understood formats such as, but not limited to, XML or JSON, where a time critical keyword match information, along with an individual word confidence scores, are being squeezed into the system without burdening the system with complex n-best lists. The real-time speech to text subsystem outputs the keywords while the words are being enunciated.

In an exemplary embodiment of the present invention, a phrase "service desk" is being spoken by the end user that is incorrectly recognized as "service task" by the real-time transcription system. The system starts identifying the words of the spoken phrase in a predefined grammar or the list of keywords in order to correct the phrase. If the keywords are spotted, the system extracts all possible keywords with their level of confidences from the predefined grammar or the list of keywords. After that, the system establishes a best match of the phrase by using the identified keywords that has a high level of confidence and outputs the correct phrase "service desk". In other words, the level of confidence or confidence score shows the best match of the spoken word with the system's predefined grammar or the list of keyword. Thus, the system allows all the users to know the correct keywords in a conversation in spite of the transcription or pronunciation mistake occurred.

In another embodiment of the present invention, a process of simultaneous grammar and keyword matching along with the statistical language model based transcription is provided. This combined process offers ease in understanding the general trend of a conversation either by human reading or by natural language processing. The process involves an algorithm that is capable of scanning the relevant pieces of information while the transcripts are being made. This results in diminishing duration of double computing of many items and thus making the entire system fast, efficient and real-time. This is achieved by converting the grammar and the list of keywords for a finite state transducer (FST), and then composing the acoustic-lattice (or commonly known as just lattice) with this FST. An alternate implementation of the same concept creates a DNN classifier from the grammars and keywords, using word embedding, and then uses this DNN to post-process the best path in the lattice.

In addition, the system can easily undergo a transition from a traditional GRXML grammar based system to a natural language based dialogue system by making the original grammar a part of its language model. If the phrase is detected from the original grammar, then the detected information is passed out in the response as an additional parameter called "meaning" that provides the stack of all the GRXML rule references that triggered the match. For an instance, an IVR (Interactive Voice Response) system that handles inbound calls and connects a caller to a right department of a company. The traditional system that is designed using GRXML allows the end user to speak the exact name of the department such as "sales". The system then returns an action tag according to the spoken name of department and redirects the call to that department. The system represented in the present invention maintains these action tags, so that if a previous end user who is familiar with the grammar speaks "sales" to the system, the behavior would be the same. However, if the end user says "I want to buy a sofa", the grammar engine would not be able to handle that because the GRXML rule for this sentence was never defined. In that case, the same automatic speech recognition (ASR) solution will process the audio to get the corresponding text, but this time, notices the absence of a tag and passes the output to a natural language understanding subsystem that returns a meaning "sales" and then a corresponding action tag is generated. In this way, the present invention expands the capabilities of the current system without sacrificing the existing functionality.

The 'end user' and the 'speaker' may be interchangeably used without departing from the meaning and scope of the present invention.

In an aspect of present invention a system for providing real-time transcripts of spoken text is disclosed. The system comprising: a speech to text engine for converting an input speech of an end user into a text input, the text input comprises one or more sequence of recognized word strings or a word lattice in text form; a semantic engine to receive the text input for producing one or more transcripts using a language model and extracting semantic meanings for said one or more transcript; wherein the semantic engine utilizes a grammar model and the language model to extract meaning for said one or more transcripts. The system is further configured to identify and store additional metadata about the end user such as age, gender, language, accent, emotional state and search and verify the end user's identity. The semantic engine, on receiving the one or more sequence of recognized word string, or the word lattice, extracts semantic meaning from the one or more sequence of recognized word strings, and associates that with a one or more action tags and entities known to the system; wherein the semantic engine further comprises a semantic mapper that is configured to label the one or more action tags by including all kinds of possible meaning of a word from the sequence of recognized word string in a particular context. The system further comprising: a query generator configured to map the one or more action tags to a one or more database queries present in an interactive workflow logic module, wherein the interactive workflow logic module handles situations arises subsequent to a dialogue response; and a natural language generator trained to receive the mapped one or more action tags and said additional data, wherein the mapped one or more action tags and said additional data are being mapped into one or more logical sentences to form a spoken response of the dialogue system in real-time. The system utilizes GRXML or JSGF or ABNF format grammars to learn the one or more action tags and entities of the semantic engine, and also for enhancing a vocabulary based on the grammar model and a vocabulary based on the language model. The system further comprises a language/accent recognition subsystem that extracts acoustic features from the input speech of the end user to identify language and/or accent the end user, said language/accent recognition subsystem comprises: a speech activity detection module to detect speech activity; a shifted delta cepstral (SDC) module to compute cepstral mean and variance normalization of the input speech and to produce SDC feature vectors; an I-vector extractor module to receive SDC feature vectors and to produce I-vectors using a deep neural network-universal background model (DNN-UBM); and a logistic regression classifier module to receive and classify the I-vectors in order to identify the end user's language or accent. The system further comprises a speaker recognition (SR) subsystem that extracts acoustic features from the input speech of the end user to identify and verify the end user, said speaker recognition subsystem comprises: a speech activity detection module to detect speech activity of the end user; an MFCC computation module to calculate Mel Frequency Cepstral Coefficient along with cepstral mean and variance normalization of the speech activity and to generate feature vectors; a keyword spotter module to provide keyword spotting based enrollment and verification of the end user; a DNN-UBM based I-vector extractor module to produce I-vectors using a deep neural network-universal background model and a probabilistic linear discriminant analysis (PLDA) based classifier module to classify the identity of the end user. The system further comprises an age and an emotion identification subsystem that detects the age and emotional state of the end user. The age and emotion identification subsystem comprises a speech activity detection module to detect speech information and to generate an output for an MFCC computation module; said MFCC computation module performs analysis of the acoustic features followed by cepstral mean and variance normalization of the input speech to identify the age and emotion of the end user; a DNN-UBM based I-vector extractor to generate I-vector for the identified acoustic features; a logistic regression classifier to classify the I-vectors to identify the end user's age and emotion. The age and emotion identification subsystem comprises of an end to end LSTM-RNN based DNN classifier; said end to end classifier has two convolutional layer followed by two Network-in-Network (NIN) layers which performs the role of feature extraction from raw waveforms; the end to end DNN classifiers also has 2 LSTM layers after the feature extraction layers followed by a softmax layer. The end to end DNN classifier has no separate acoustic feature extraction module at signal processing level and raw speech frames obtained from end user's input speech waveform are directly presented to the input layer of the DNN. The emotion identification system provides provisions of both discrete and continuous classification of end user's emotional level; said discrete classification of end user's emotion comprises classes like anger, happiness, anxiety, neutral, boredom and sadness; and the continuous classification of end user's emotion provides rating of emotional level in two continuous scale called valence and arousal.

In another aspect a method for providing real-time transcripts of spoken text is disclosed. The method comprising: converting, by a speech to text engine, an input speech of an end user into a text input, the text input comprises one or more sequence of recognized word strings and confusions in text form; receiving, by a semantic engine, the text input for producing one or more transcripts using a language model and extracting semantic meanings for said one or more transcript; wherein the semantic engine utilizes a grammar model and the language model to extract meaning for said one or more transcripts. The method further comprises identifying and storing additional metadata about the speaker, such as age, gender, accent and emotional state of the end user. The sequence of recognized word strings are assigned with one or more action tags and entities. The method further comprises step of extracting acoustic features from the input speech of the end user to identify language and/or accent the end user. The method further comprises step of extracting acoustic features from the input speech of the end user to identify and verify the end user. The method further comprises step of extracting acoustic and pitch features from the input speech to identify age and emotion of the end user.

FIG. 1 illustrates a block diagram of a dialogue response system, in accordance with an embodiment of the present invention. The dialogue response system 100 comprises a speech to text engine 102, a semantic engine 104, a query generator 106, an IVR workflow logic module 108, a natural language generator 110, a text to speech engine 112, an IVR application database 114A, an analytics database 114B, a speech to semantic mapper 116 and a language, accent, gender, age and emotion recognition engine 118 that consists of a language/accent recognition (L/AR) subsystem, speaker recognition (SR) subsystem, age identification (AgeID) subsystem and emotion identification (emotionID) subsystem. When an end user spoken audio is fed through some source in the dialogue engine 100, the speech to text engine 102 converts the audio spoken by the end user into the text in real-time fashion by identifying additional pieces of information such as language, gender, age and emotion of the end user. These additional pieces of information are then used by the semantic engine 104, IVR workflow logic module 108 and the natural language generator 110 to control the flow of the dialogue. The semantic engine 104 then receives the output of the speech to text engine 102, which contains a sequence of recognized word strings spoken by the end user, along with confusions in text form. The semantic engine 104 extracts semantic meaning from the words and assigns an action tag to the speech sequence according to the meaning by utilizing a pre-trained knowledge that consists relevant meaning and context in which the words are being used.

At the backend, the speech to semantic mapper 116 provides list of manually labeled semantic tags as an input to the semantic engine 104. Such list of manually labeled semantic tags is a very comprehensive representation including all kinds of possible meaning of a word in a particular context extracted from a plurality of large set of data sources 122 such as Wikipedia, news, books, articles, conversation between people, speech to text transcripts and the like. The words herein are basically a part of speech recognition language model 120 or a grammar specification like GRXML, JSGF, ABNF and call flows. The semantics may correspond to actions, events, named entities and relationships. The manual mapping is then converted to vectors through a model and labels the spoken word sequence with the corresponding semantic meaning and provides the output to the semantic engine 104.

When the end user sends a request to the dialogue engine 100, the semantic engine 104 derives the possible meaning of the words. The dialogue engine 100 uses all the historical information stored in the IVR application database 114A and the analytics database 114B in the context of the word while decoding the meaning of the input speech signal. Based on the meaning of the words, the semantic engine 104 understands the action required. The action output from the semantic engine 104 is then passed to the query generator 106. The query generator 106 present herein, is a standard system component that takes the semantic tags arising from the speech to text engine 102 and maps the semantic tags to database queries present in the IVR workflow logic module 108 that is necessary for composing a dialogue response. The IVR workflow logic module 108 is responsible for handling the special situations that may arise subsequent to the dialogue response. For an instance, if the end user says something that may result in abandoning the current query and starting a new one, or if too much information is available, and it cannot be presented in a simple dialogue, the information will be broken down and only important pieces are presented. This logic will be different from one application to another.

The natural language generator 110 receives the required data from the IVR workflow logic module 108. The natural language generator 110 is trained by presenting filters, database query responses, dialogue state, and potentially other metadata such as the user's age, gender and emotional state. It maps these entities into a logical sentence that would form the spoken response of the dialogue engine. The natural language generator 110 also uses additional inputs of age and gender and emotional state. These entities of the end user are mapped to form logical sentences or words and then the corresponding response is provided to the end user by the text to speech engine 112 of the dialogue engine 100.

In an embodiment, the present invention implements various neural network and machine learning paradigms to train dialogue engine 100 in order to map the spoken words, extract various action tags and data to provide real-time transcription to the end user.

Figure 2:
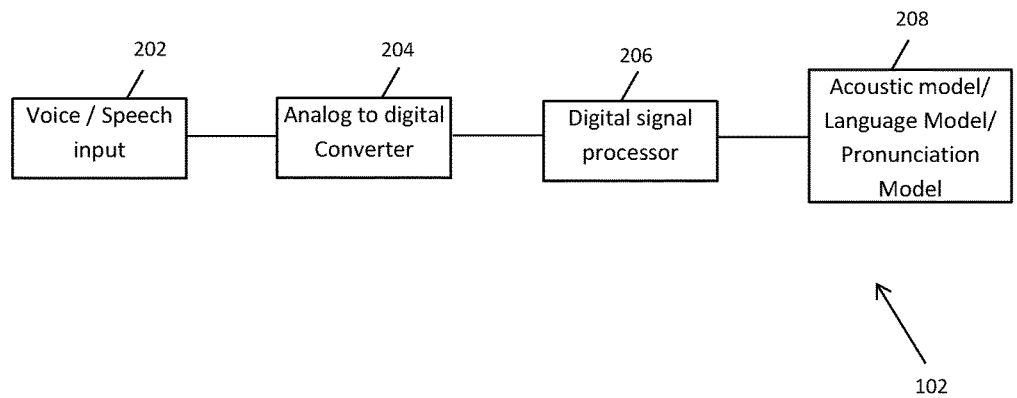
FIG. 2 represents a block diagram of a speech to text engine, in accordance with an embodiment of the present invention.

FIG. 2 represents a block diagram of a speech to text engine, in accordance with an embodiment of the present invention. The speech to text engine 102 may comprise a voice/speech input block 202, an analog to digital converter 204, a digital signal processor 206 and an acoustic model/language model/pronunciation model block 208. The speech to text engine 102 converts an audio speech spoken by the end user into the text in real-time fashion. The voice/speech input block 202 receives the audio speech spoken by the end user. Said audio speech then gets converted by the analog to digital converter 204 and fed to the digital signal processor 206 to process the digital signal. The acoustic model/language model/pronunciation model 208 then processes the provided language, application domain, accent, dialect, and the like from the input signal. Further, the output contains a sequence of recognized word strings, spoken by the user, along with confusions in text form. The speech to text engine 102 has capability to perform on the fly keyword search for additional identification of the language, gender, age and emotion of the speaker. The additional pieces of information, identified by the speech to text engine 102, are used by the semantic engine 104, IVR workflow logic 108 and the natural language generator 110 to control the flow of the dialogue.

Figure 3:
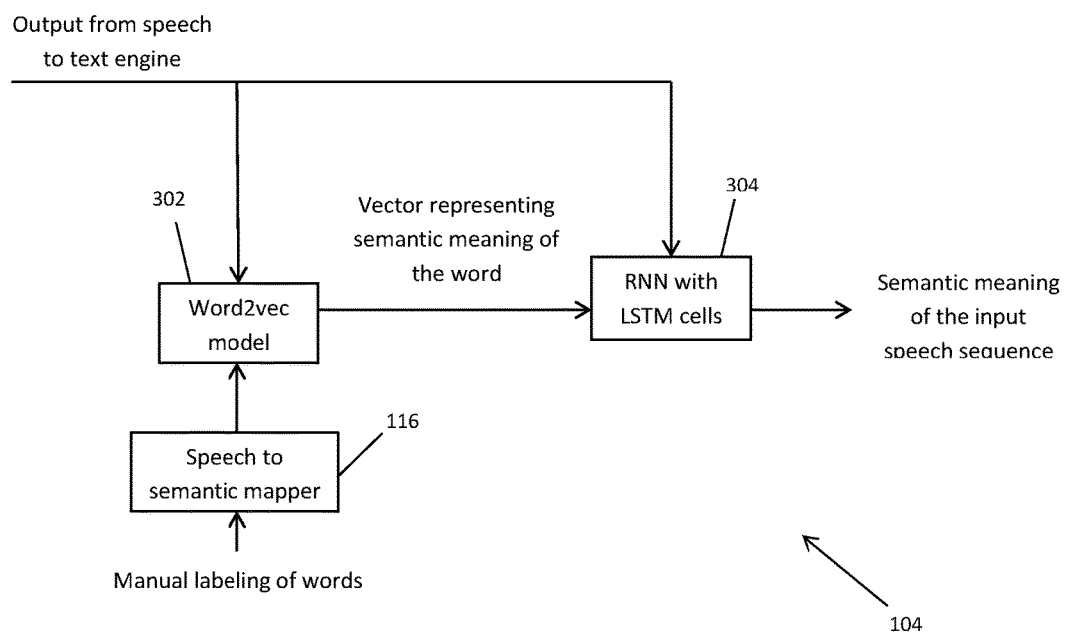
FIG. 3 illustrates a schematic representation of a semantic engine, in accordance with an embodiment of the present invention.

FIG. 3 illustrates a schematic representation of a semantic engine, in accordance with an embodiment of the present invention. The semantic engine 104 receives the output of the speech to text engine 102. The output contains a sequence of recognized word strings, spoken by the user, along with confusions either in text form or in the form of a word lattice. The semantic engine 104 is used to extract semantic meaning from the words and assign an action tag to the speech sequence according to the meaning. In order to assign an action tag to every piece of word string, the semantic engine 104 utilizes a pre-trained knowledge that consists relevant meaning and context in which the words are used. Further, the semantic engine 104 consists of a speech to semantic mapper 116 that is trained using manual labeling of words, and potentially mappings obtained from grammars relevant to the dialogue system. The semantic mapper 116 ingests the list of manually label semantic tags as input with all kind of possible meaning of a word in a particular context. An intermediate output of the speech to semantic mapper 116 is a word2vec model 302 which encodes the meaning of words. The word2vec model converts the words into a vector that represents semantic meaning of the particular word. We could call this a semantic vector space because sentences with similar meaning have a small Euclidian distance between vectors. The vector representation of words, learned by the word2vector models 302, carries semantic meanings of words that can be used to train a model for labeling a word sequence present in the text of the input speech. In an alternate embodiment, if the text is not desired, speech could be converted directly to a semantic vector, using a deep neural network. The word vectors are used to train a recurrent neural network (RNN) model with long short term memory (LSTM) cells with attention 304 by utilizing deep learning strategy to obtain the final semantic tags.

In an embodiment of the present invention, the speech to text engine 102 takes natural language input and annotate the semantic representation of the input and these annotated pieces of text are used to train the semantic engine 104 that learns to tag the output. Often, the conventional dialogue system does not behave correctly as per the requirement; the present invention incorporates new scenarios and improvement to make the dialogue system usable for the end user.

In the semantic meaning extraction approach, the present dialogue engine continues to use the existing IVR grammars that have been in use for a while. The speech to semantic mapper 116 uses a software analysis of the grammar that extracts action tags and entities of the grammar output and relates those to the possible sentences and phrases in the grammar. The speech to semantic mapper 116 also includes another large dataset of naturally occurring text in the language from websites and articles or text books etc. Analysis of these data allow the semantic engine 104 to draw correlations between spoken words and the extracted words in order to convert each word to a low dimensional vector using a word embedding. Further, a second step in processing takes the low dimensional vectors to map each of the sentences in the grammar. After the mapping of each of the sentences, the dialogue engine 100 trains another neural network to learn the output tags for each of these vectors. The word embeddings are trained on very large amounts of text in the target language. However the classifier is subsequently trains on only a smaller number of tags that are available from the grammar. However the natural proximity of semantically similar phrases in the classifier to the grammar phrases, allow the engine to generalize and tag semantically similar phrases with the correct tags.

In an alternate representation, any machine learning paradigm instead of neural networks can be used in the tagging and mapping process.

Figure 4:
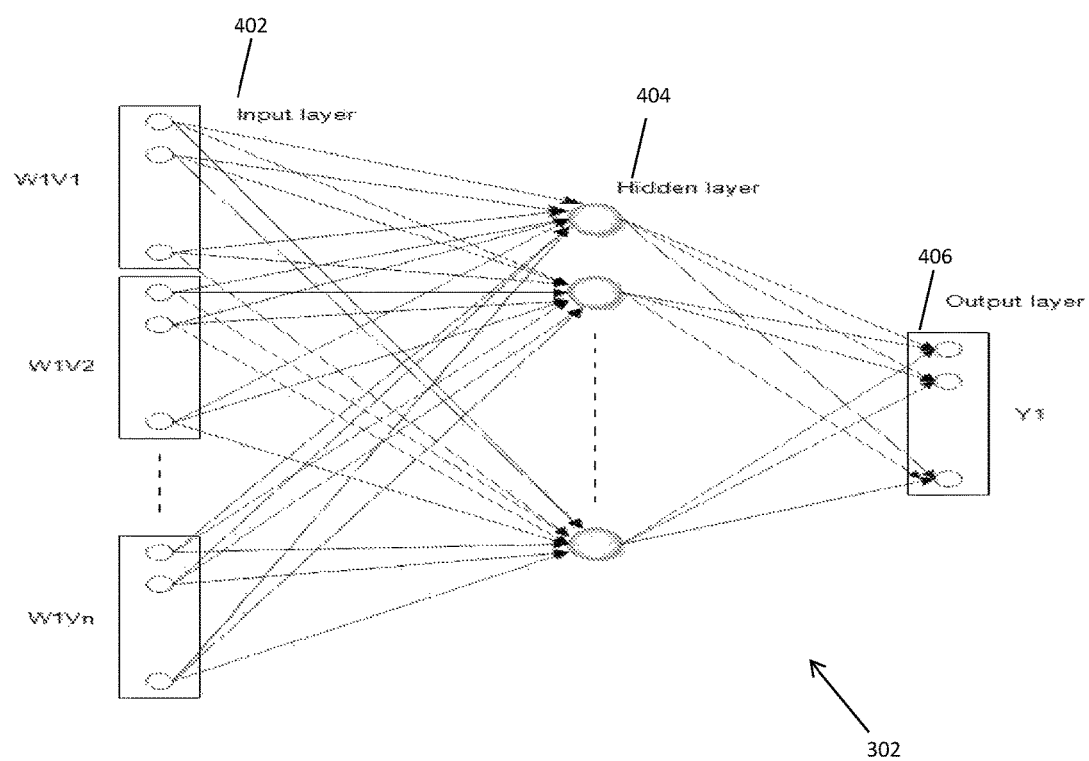
FIG. 4 illustrates a schematic representation of a word2vec model used for training an LSTM-RNN model, in accordance with an embodiment of the present invention.

FIG. 4 illustrates a schematic representation of a word2vec model used for training an LSTM-RNN model with attention, in accordance with an embodiment of the present invention. The word2vec model 302, used in the semantic engine 104, is designed as a continuous bag of word (CBOW) by using a multilayer neural network with one or more hidden layers 404. The word2vec model 302 models multi-word context with a computationally efficient hierarchical softmax updates to learn the output vectors. Referring to FIG. 4, there are multiple input vectors W1V1, W1V2, ... , W1Vn present at an input layer 402 that represents the possible candidate words appear in different context by different end user. The input layer 402 along with the hidden layer 404 is used to generate an output vector Y1 at an output layer 406 representing a particular semantic meaning of a word. The output vector Y1 of the word2vec model 302 is used for training a LSTM-RNN attention model 304. The LSTM-RNN 304 encodes the input speech word sequence into an action or semantic tag using the intermediate word2vec representation. This approach becomes beneficial for enabling the word2vec model to convert multiple words representing different context into a one class vector representing the inherent meaning. As a result, the recurrent neural network (RNN) uses that output class vector for the word. In other words, the word2vec model 302 learns the semantic meaning word by word, whereas the RNN-LSTM 304 learns the semantic meaning of the entire input speech sentence.

When the end user sends a request to the dialogue engine 100, the semantic engine 104 derives the possible meaning of the words. The dialogue engine 100 uses all the historical information stored in the analytics database 114B and the IVR application database 114A (as needed) in the context of the word while decoding the meaning of a new input speech signal. Based on the meaning of the words, the semantic engine 104 understands the action required. At last, the action output is passed to a query generator 106. The query generator 106 maintains interactive voice response data flow to IVR workflow logic module 108. The query generator 106 takes the semantic tags arising from the speech-to-text and maps the tags to the database queries that would be necessary for composing a dialogue response. The IVR workflow logic module 108 is responsible for handling the special situations that may arise subsequent to the dialogue response. For an example, the IVR workflow logic 108 comes in role when the user speech abandons the current query and starts a new query or too much information available to be presented in a simple dialogue. In this case, the IVR workflow logic module 108 breaks down the information into pieces and only pass the important piece of information. The logic used by the IVR workflow logic module 108 may differ from one application to another.

The natural language generator 110 receives the output from the IVR workflow logic module 108 and generates natural language from a machine representation system. The natural language generator 110 is trained by filters database query responses, dialogue state, and potentially other metadata such as the user's age, gender and emotional state. Further, the natural language generator 110 maps these entities into a logical sentence that is used to form the spoken response of the dialogue system. The natural language generator (NLG) 110 also processes additional inputs such as, but not limited to, age, gender, and emotional state etc. for appropriate choice of words. The dialogue engine 100 uses the text to speech engine 112 that converts natural language text into an audio speech for the user as a response to their dialogue.

Figure 5:
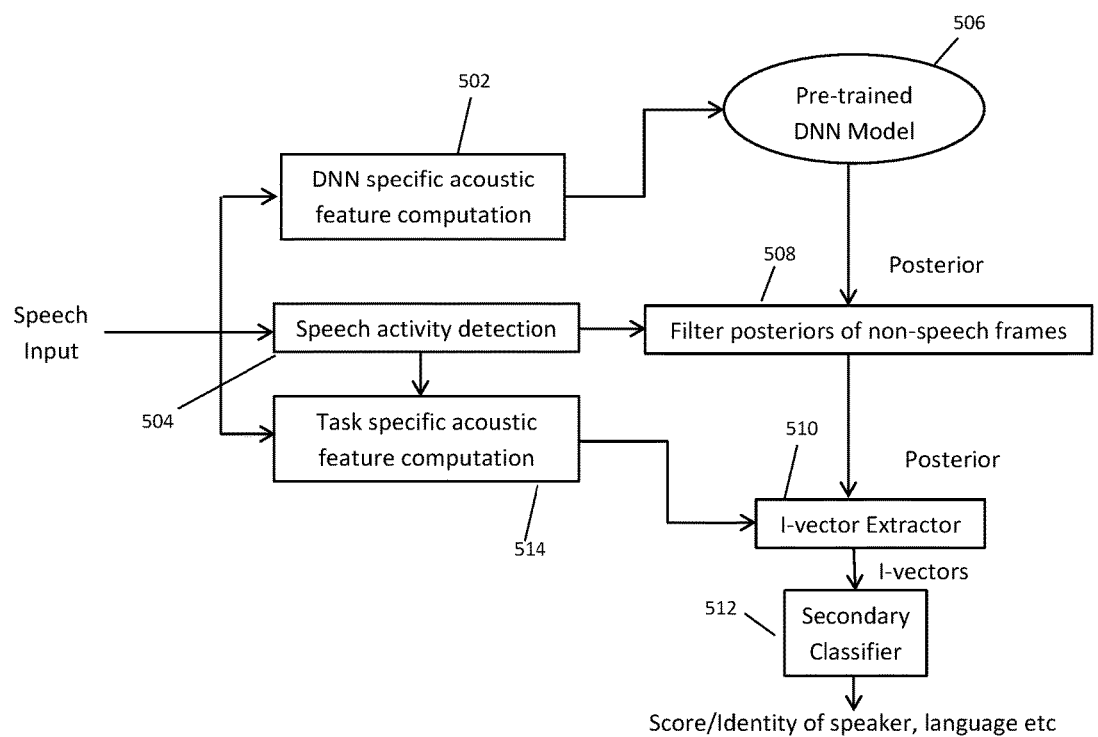
FIG. 5 illustrates a schematic representation of a language, accent, gender, age, and emotion recognition engine, in accordance with an embodiment of the present invention.

FIG. 5 illustrates a schematic representation of a language, accent, gender, age, and emotion recognition engine, in accordance with an embodiment of the present invention. The language, accent, gender, age, and emotion recognition engine 118 described by the present invention detects additional information about the input speech signal like language, accent, gender, age and emotional state of the speaker (end user). The language, accent, gender, age, and emotion recognition engine 118 can also search or verify the end user's identity if the end user is enrolled beforehand. To perform specific recognition tasks, the language, accent, gender, age, and emotion recognition engine 118 uses Deep Neural Network (DNN) acoustic models in an I-vector framework and trains individual secondary classifiers like Probabilistic Linear Discriminant Analysis (PLDA), Multinomial Logistic Regression etc. on top of it. FIG. 5 shows a generalized process diagram of these recognition subsystems.

The language, accent, gender, age, and emotion recognition engine 118 uses Deep Neural Network (DNN) as a universal background model (UBM) for accumulating a sufficient statistics (SS) in the I-vector framework. This DNN is trained as the acoustic model just like in automatic speech recognition (ASR) system with large amount of manually annotated speech audio data. The time delay DNN has 6 layers and a sub sampling configuration. The multisplice splicing configuration is as follows: Suppose t is some frame. At the input layer (layer 0) frames [t−2, t+2] are spliced together. At layers 1, 3 and 4 frames [t−2, t+1], [t−3, t+3] and [t−7, t+2] are spliced together respectively. In total the DNN has a left context of 13 and right context of 9. The DNN uses P-norm non linearity as activation functions in the hidden layers, where P=2. The output of the DNN is a softmax layer which computes posteriors for 5297 triphone states. The DNN is trained using Natural Gradient for Stochastic Gradient Descent (NG-SGD) algorithm. The initial effective learning rate is 0.0015 and final effective learning rate is 0.00015. The size of GPU based training mini-batch is 512 and the DNN is trained for 6 numbers of epochs. The alignments for phonetic content (tied triphone states) obtained from the output layers of such DNN is used for computing posterior of the feature vectors to train the I-vector model. The mathematical treatment can be described as follows—

In the I-vector model the total factor w is defined by the posterior distribution of the T feature vectors of utterance Y=y1, y2, ... , yT conditioned to the following Baum-Welch statistics, $$N_c = \Sigma_{t=1}^{T} P(c|y_t, \lambda) \quad (1)$$

$$F_c = \Sigma_{t=1}^{T} P(c|y_t, \lambda) y_t \quad (2)$$

$$\tilde{F}_c = \Sigma_{t=1}^{T} P(c|y_t, \lambda)(y_t - \mu_c) \quad (3)$$

Where, c is the Gaussian index representing j=1, ... , M mixture components, $P(c|y_t, \lambda)$ corresponds to the posterior probability of mixture component c generating the vector $y_t$, given UBM $\lambda$ and $\mu_c$ is the mean of UBM mixture components c. In practice, the posterior probability of the event that the feature vector $y_t$ is generated by the mixture component c, is the alignment of feature vector $y_t$ represented by the $c^{th}$ Gaussian. In the DNN based I-vector system, the Gaussian index c is replaced by the class index k of DNN and posteriors from the $k^{th}$ DNN class is used to replace the $P(c|y_t, \lambda)$s in eq. 1 to 3. The posteriors of the $c^{th}$ Gaussian which is used as the alignments of a feature vector is represented by the senones predicted by the DNN. The use of DNN for posteriors computation provides significant improvement in language recognition results. The reason for this improvement is that in automatic speech recognition (ASR) DNN, the classes corresponding to senone and posteriors are accurately computed to predict the senone and hence correct frames are used to estimate the shift in the means for them. Thus, the I-vector system is able to differentiate the minute pronunciation variations of different phonemes occurred due to the change of speaker, language etc. In contrast to these, the original GMM-UBM defined classes and posteriors have no inherent meaning. Each Gaussian simply covers a part of the feature space which might include instances of different phones or triphones and very little pronunciation variations. The supervised training of ASR-DNN is playing a big role in this improvement of results.

In an embodiment of the present invention, the language, accent, gender, age, and emotion recognition engine 118 takes the speaker's speech as an input. The speech input is provided to the DNN specific acoustic feature computation 502, a speech activity detection module 504 and a task specific acoustic feature computation 514 to process the speech input. On detection of speech activity, the Deep Neural Network specific acoustic feature computation recognizes acoustic events in the speech sequence and transfers all 40 filter-bank coefficients without cepstral truncation creating a 40 dimensional high resolution MFCC features to a pre-trained DNN model 506 that consists relevant meaning and context in which the words in the speech sequence are being used. Further, a filter module 508 filters the posteriors of non-speech frames from the speech activity detection 504 as well as from the data forwarded from the pre-trained DNN model 506. The filtered output is provided to an I-vector extractor module 510, which is trained using a separate set of manually annotated training data. The I-vector extractor module 510 receives data from a task specific acoustic feature computation module 514, wherein the task specific acoustic feature computation module 514 is used to analyze the acoustic feature of the end user's speech. Further, as an input, the I-vector extractor module 510 also receives the posteriors and thus produces I-vectors of 600 dimensions. These I-vectors are fed to a secondary classifier 512 to generate parameters such as score, identity, language and the like of the end user.

To perform specific recognition tasks such as the end user related information, the language, accent, gender, age, and emotion recognition engine 118 uses Deep Neural Network (DNN) acoustic models in the I-vector Extractor 510 and trains the secondary classifier 512 like Probabilistic Linear Discriminant Analysis (PLDA) for end user's identity classification and, Multinomial Logistic Regression for language, age, emotion classification.

In an aspect of the present invention, the language, accent, gender, age, and emotion recognition engine 118 is also capable of searching and verifying the end user's (speaker's) identity if the end user is enrolled before in the database of the dialogue engine 100. At the same time, the language, accent, gender, age, and emotion recognition engine 118 is capable of providing almost all kinds of end user related information contained in the signal along with a message.

The present invention uses a monolingual DNN as UBM with a time delay neural network architecture that can model long term temporal dependencies between acoustic events in a speech signal. The time delay neural network is basically a feed forward network with a sub sampling framework. Herein, a narrow temporal context is provided to the first layer i.e. the input layer 402 and increasingly wide contexts are available to the subsequent hidden layers 404 as illustrated in FIG. 4. As a result, higher levels of the network are able to learn greater temporal relationships. Due to selective computation of time steps, such sub-sampling scheme reduces the overall necessary computation during the forward and backward pass computation during training. Thus, the time delay architecture with such sub sampling method is more helpful in the present scenario due to basic advantages—one is less computation and the other is parallelization. Despite being feed-forward architecture with no recurrent connection between layers it can capture and effectively model temporal context. However, the noticeable aspect is that it provides such temporal modeling with very less computation where hidden activations at only few time steps are computed at each level. On the other hand due to its feed forward structure, parallelization can be easily implemented with less training time unlike a network having feedback connections.

Figure 6:
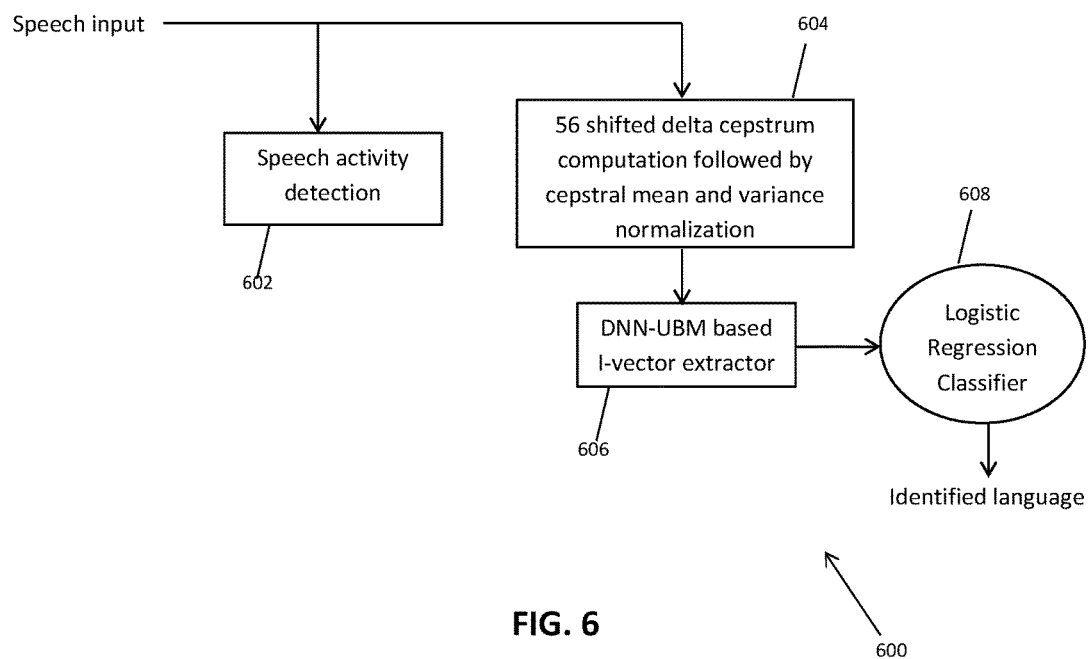
FIG. 6 represents a schematic diagram of a language/accent recognition subsystem using a DNN-UBM based I-vector extractor, in accordance with an embodiment of the present invention.

FIG. 6 represents a schematic diagram of a language/accent recognition subsystem using a DNN-UBM based I-vector extractor, in accordance with an embodiment of the present invention. The language/accent recognition subsystem 600 includes a speech activity detection module 602, a shifted delta cepstral (SDC) module 604, an I-vector extractor module 606 and a logistic regression classifier module 608. When a speech activity is detected, the language/accent recognition subsystem 600 uses a shifted delta cepstral (SDC) computation that is followed by cepstral mean and variance normalization over a 3 sec window. The language/accent recognition subsystem 600 utilizes 56-dimensional shifted delta cepstral (SDC) acoustic features in a GMM-UBM based I-vector framework. The SDC feature vectors are created by stacking delta cepstra computed across multiple speech frames thus, SDC feature vectors captures the speech dynamics over a wider range of speech frames than a first and a second order Mel Frequency Cepstral Coefficient (MFCC) derivatives, wherein MFCC represents a short-term power spectrum of the speech signal, based on a linear cosine transform of a log power spectrum on a nonlinear mel scale of frequency. The SDC features are generated using the conventional 7-1-3-7 scheme from 7 static cepstra. The SDC feature vectors are then provided to the I-vector extractor module 606. The 600-dimensional I-vectors generated from DNN-UBM based I-vector extractor 606 are then classified using the logistic regression classifier 608 to identify the end user's language or accent.

The I-vectors, used herein, can be classified in three different environments—a generative model, where classes are modeled by Gaussian distributions with shared covariance matrix, and two discriminative classifiers, namely linear Support Vector Machine and Logistic Regression. In an embodiment of the present invention a logistic regression classifier is used. The logistic regression classifier 608 is a multinomial logistic regression classifier. The number of output classes of the logistic regression equals the number of language classes of the language identification subsystem.

The present invention also provides advantage in terms of computational time and accuracy in computing feature posteriors used to train the I-vectors and hence provides relative improvements of performance. The present invention uses a monolingual DNN in the language/accent recognition subsystem 600. Further, a subspace technique is used by the I-vectors in order to model variations from the UBM while if the DNN-UBM models a normal language, the I-vector shall focus more on the variations in the language. According to the variations in the I-vector, the extracted I-vectors are classified and hence the end user's language/accent is identified.

The system and method, as described in FIG. 5 and FIG. 6, provides ability to extract additional metadata about the end user such as the age, gender, accent and emotional state of the end user and search to match the information from a pre-established database. When the sound of the end user matches with any other end user in the database such as the analytics database 114B and/or the IVR application database 114A, the dialogue engine 100 can help the response system, human or machine; to give a better suited response of the end user queries. For an instance, if the end user wants to connect to an agent who speaks the same language or has a similar accent. In that case, the language, accent, gender, age, and emotion recognition engine 118 uses the additional metadata to select the right language and tonal qualities that better please the end user of that age, gender, accent and other related pieces of information. Thus, the dialogue engine 100 provides a matching response accent which is better understood and appreciated by the end user.

Figure 7:
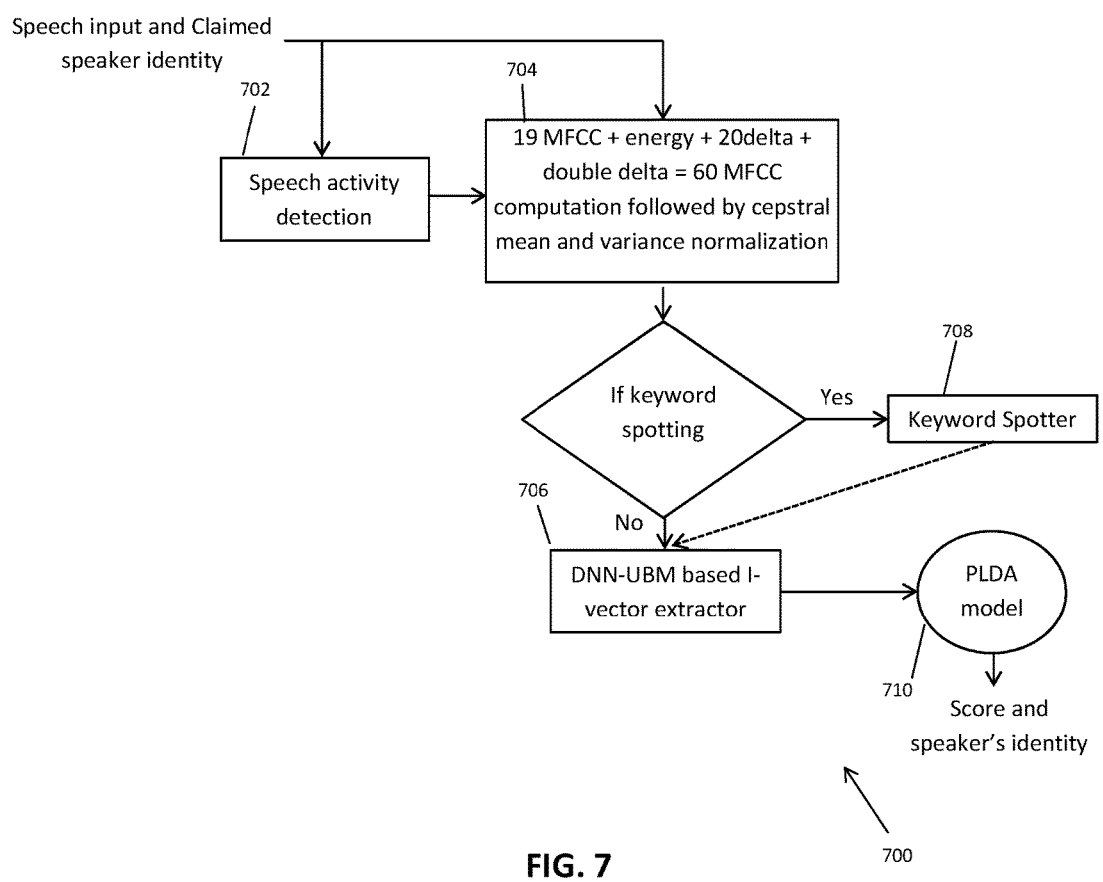
FIG. 7 illustrates a schematic representation of a speaker recognition (SR) subsystem, in accordance with an embodiment of the present invention.

FIG. 7 illustrates a schematic representation of a speaker recognition (SR) subsystem, in accordance with an embodiment of the present invention. The speaker recognition (SR) subsystem 700 presented herein, uses a DNN-UBM based I-vector extractor 706 and a probabilistic linear discriminant analysis (PLDA) based classifier 710. The speaker recognition subsystem 700 is capable of performing verification as well as identification of the end user or speaker. The speaker recognition subsystem 700 includes a speech activity detection module 702, an MFCC computation module 704, the DNN-UBM based I-vector extractor module 706, a keyword spotter module 708 and the probabilistic linear discriminant analysis (PLDA) based classifier module 710. According to the method disclosed in the speaker recognition subsystem 700, a new speaker can be enrolled to generate a speaker's model for their identification and verification in future. On the other hand, the identity of the old end user can be searched within the enrolled speaker's model. The speaker recognition (SR) subsystem 700 uses the DNN-UBM based I-vector extractor 706 and the Probabilistic Linear Discriminant Analysis (PLDA) based classifier 710 for scoring the I-vectors. Further, the SR subsystem 700 also has a provision of keyword spotting 708 based enrollment and verification of the end user. The system facilitates end user to specify if they want a keyword spotting based enrollment and verification. On detection of speech from the end user, the Mel Frequency Cepstral Coefficient (MFCC) module 704 calculates 60 MFCC parameters along with cepstral mean and variance normalization. The MFCC module 704 calculates a short-term power spectrum of the speech signal, based on a linear cosine transform of a log power spectrum on a nonlinear mel scale of frequency and also reduces the noise in the speech input to provide robust speech recognition. The feature vectors generated from the MFCC module 704 is 60 dimensional comprises of 19 static, energy, 20 delta and 20 acceleration coefficients and it is provided to the keyword spotter module 708 if the end user has opted for the same, else the DNN-UBM based I-vector extractor 706 and the Probabilistic Linear Discriminant Analysis (PLDA) based classifier 710 directly generates the scores for the I-vectors that represent the identity of the end user.

Figure 8:
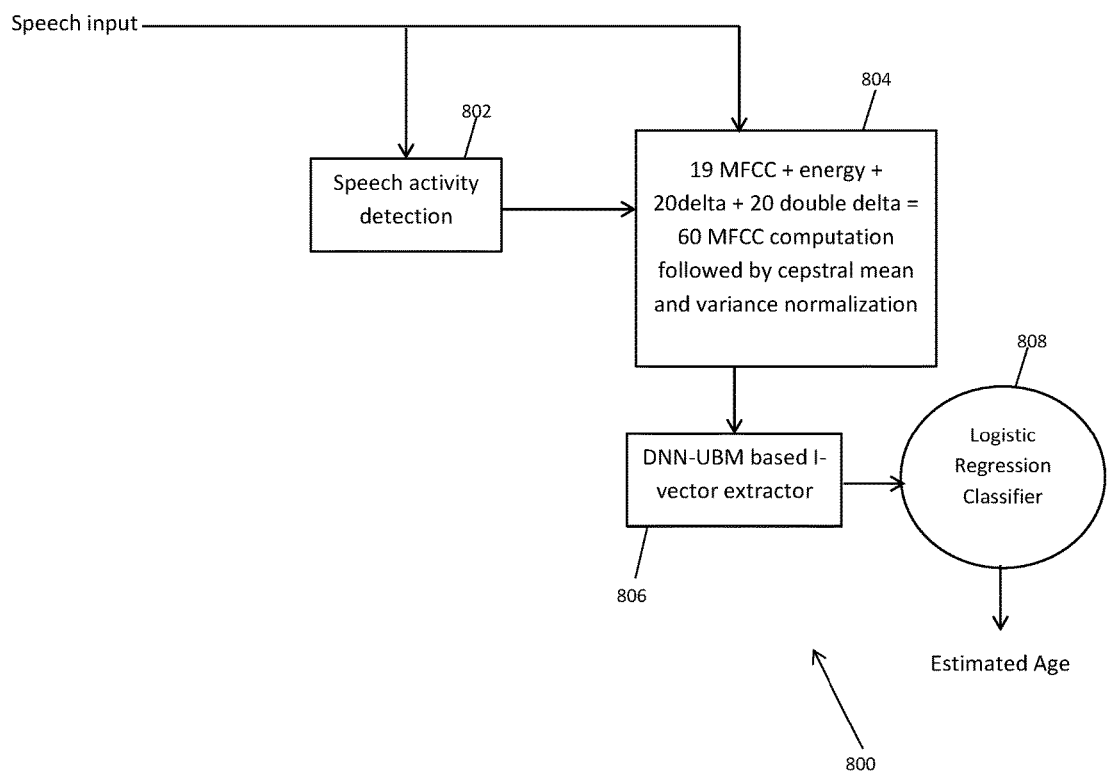
FIG. 8 illustrates a schematic representation of an age identification subsystem, in accordance with an embodiment of the present invention.

FIG. 8 illustrates a schematic representation of an age identification subsystem, in accordance with an embodiment of the present invention. The age identification subsystem 800 uses a DNN-UBM based I-vector extractor 806. In the conventional technologies, the age identification is performed using the human face features; however, the present invention provides a unique solution of age detection from human speech features. The age identification subsystem 800 utilizes two different architectures for age identification of the end user. The first architecture uses acoustic and pitch features extracted from speech signal in the DNN based I-vector extractor 806 framework. The age identification subsystem 800 further includes a speech activity detection module 802 to detect speech information and to generate an output for an MFCC computation module 804. The MFCC computation module 804 performs analysis of the acoustic features followed by cepstral mean and variance normalization of the speech signal in order to identify the age of the speaker. The output is provided to the DNN-UBM based I-vector extractor 806 that performs same function as described above in the speaker recognition subsystem 700. At the end, the I-vectors are classified using a logistic regression classifier 808 to identify the end user's age.

Figure 9:
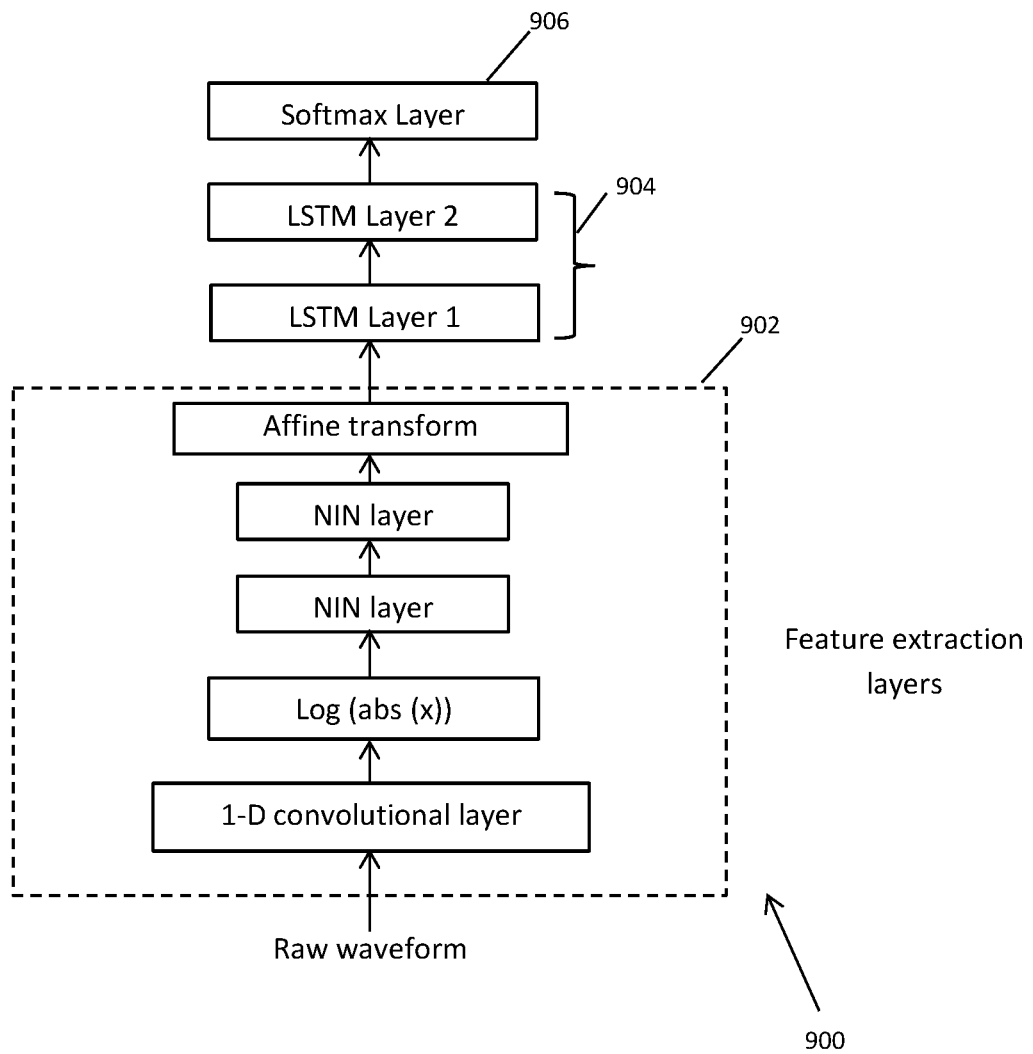
FIG. 9 shows a block diagram representing an end to end structure for age and emotion estimation, in accordance with an embodiment of the present invention.

The other architecture for age identification is described in FIG. 9. FIG. 9 shows a block diagram representing an end to end structure for age and emotion estimation, in accordance with an embodiment of the present invention. The other architecture for age identification is built in end to end deep neural structure using raw waveforms, which can be used to predict age as well as emotion rating of the end user. In the DNN architecture 900, a feature extraction part 902 is integrated as a separate layer along with classification layers 904 in the same DNN architecture. The feature extraction layers 902 include a 1-D convolutional layer followed by two network-in-network (NIN) layers in order to perform the role of feature extraction. The number of filters in the convolution layer is 100, dimension is 250 and step size is 10. Further, the classification layers, including an LSTM layer 1 of cell-dim 512 and an LSTM layer 2 of cell-dim 1024, are followed by a 72 dimensional softmax layer 906 that performs the classification. Thus, the system does not need separate signal processing blocks for feature extraction and classification, which preserves both computation cost and training time. When the raw waveform of the speech signal is provided in the architecture 900, the 1-D convolutional layer does convolutions over the input layer to compute the output of the raw waveform and to perform feature extraction. The 1-D convolutional layer comprises rectangular grid of neurons with learnable weights and biases and requires the previous layer to have a similar rectangular grid of neurons as the convolution layer is the reflection of the previous layer with same weights of the neurons. The rectangular grids of neurons are then subsampled to produce a single output. This single output is forwarded to the log (abs(x)) block that calculates the absolute logarithmic value and this value is then provided to two NIN layers that enhance the model discriminability for local receptive field by implementing micro neural network which is a potent function approximation. The modeled data is then provided to an affine transformation block that corrects the distortions or deformations in the raw waveform, thus feature of the acoustic signal is extracted. The extracted features are provided to the classification layers

904 that have two LSTM layers as LSTM1 and an LSTM layer 2. The Long Short Term Memory layers LSTM1 and LSTM2 are made from recurrent neural network and learn long-term dependencies from experience. These layers processes one word at a time and computes probabilities of the possible values for the next word in the sentence. Further, they classify and predict time series of the extracted features with the help of the softmax layer 906 that performs the classification by using multinomial distribution to predict age and emotion of the end user.

Figure 10:
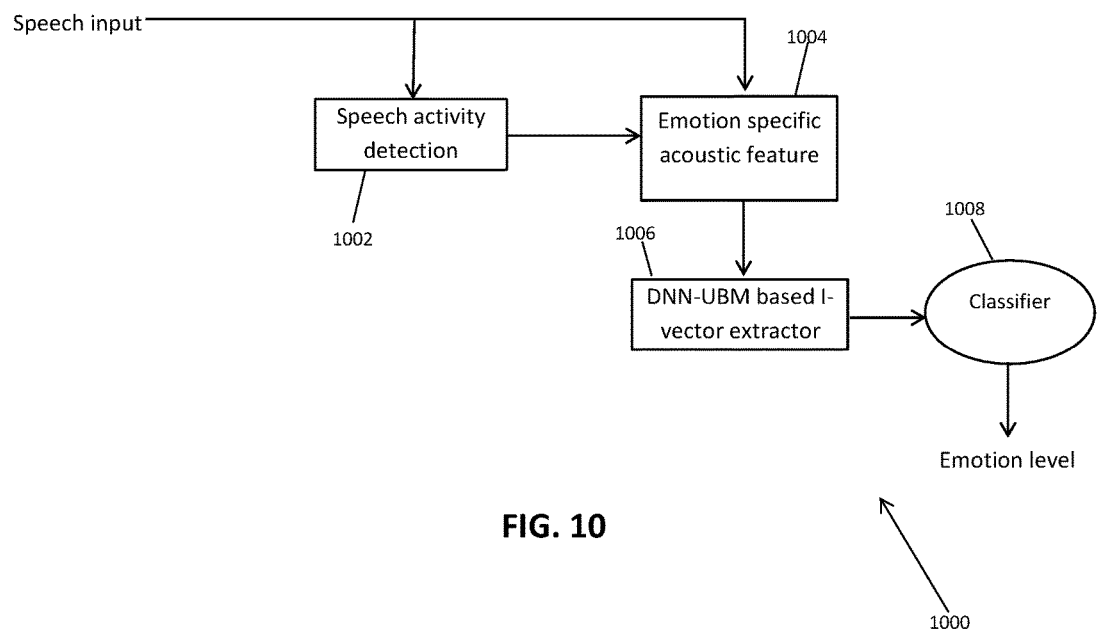
FIG. 10 illustrates a block diagram of an emotion identification subsystem, in accordance with an embodiment of the present invention.

FIG. 10 illustrates a block diagram of an emotion identification subsystem, in accordance with an embodiment of the present invention. The emotion identification subsystem 1000 includes a speech activity detection module 1002, an emotion specific acoustic feature module 1004, a DNN-UBM based I-vector extractor 1006 followed by a classifier module 1008 to generate emotional level of the speech uttered by the user. The system 1000 uses acoustic features like pitch and MFCC from the emotion specific acoustic feature module 1004 to provide the DNN-UBM based I-vector extractor 1006. The emotion identification subsystem 1000 makes the dialogue engine 100 a truly emotionally sensitive speech to text system. The emotion identification subsystem is able to comment on the end user's emotion in two different ways. Firstly, it provides the information of emotional state of the end user on a hierarchical classification of emotion state as anger, happiness, anxiety, neutral, boredom, sadness and the like. Secondly, it provides a rating of emotion level on a scale of −1 to +1 (at a step of 0.04) in terms two independent variables in continuous time domains, i.e. arousal and valence. Wherein "arousal" is the level/amount of physical response and "valence" is the emotional "direction" of an emotion. The extreme cases in arousal scale can be termed as the 'high' arousal and 'low' arousal in response to the environmental stimuli. On the other hand, extreme cases in valence can be 'negative' and 'positive' emotion. The emotion identification subsystem 1000 for emotion classification shown in FIG. 10 is designed in the DNN based I-vector framework and uses acoustic features like pitch and MFCC to train the I-vector extractor. However, the emotion rating is obtained from an end to end deep neural structure using raw speech waveforms disclosed in FIG. 9. The emotion identification subsystem 1000 uses trained DNN to provide an estimate of emotion levels.

Figure 11:
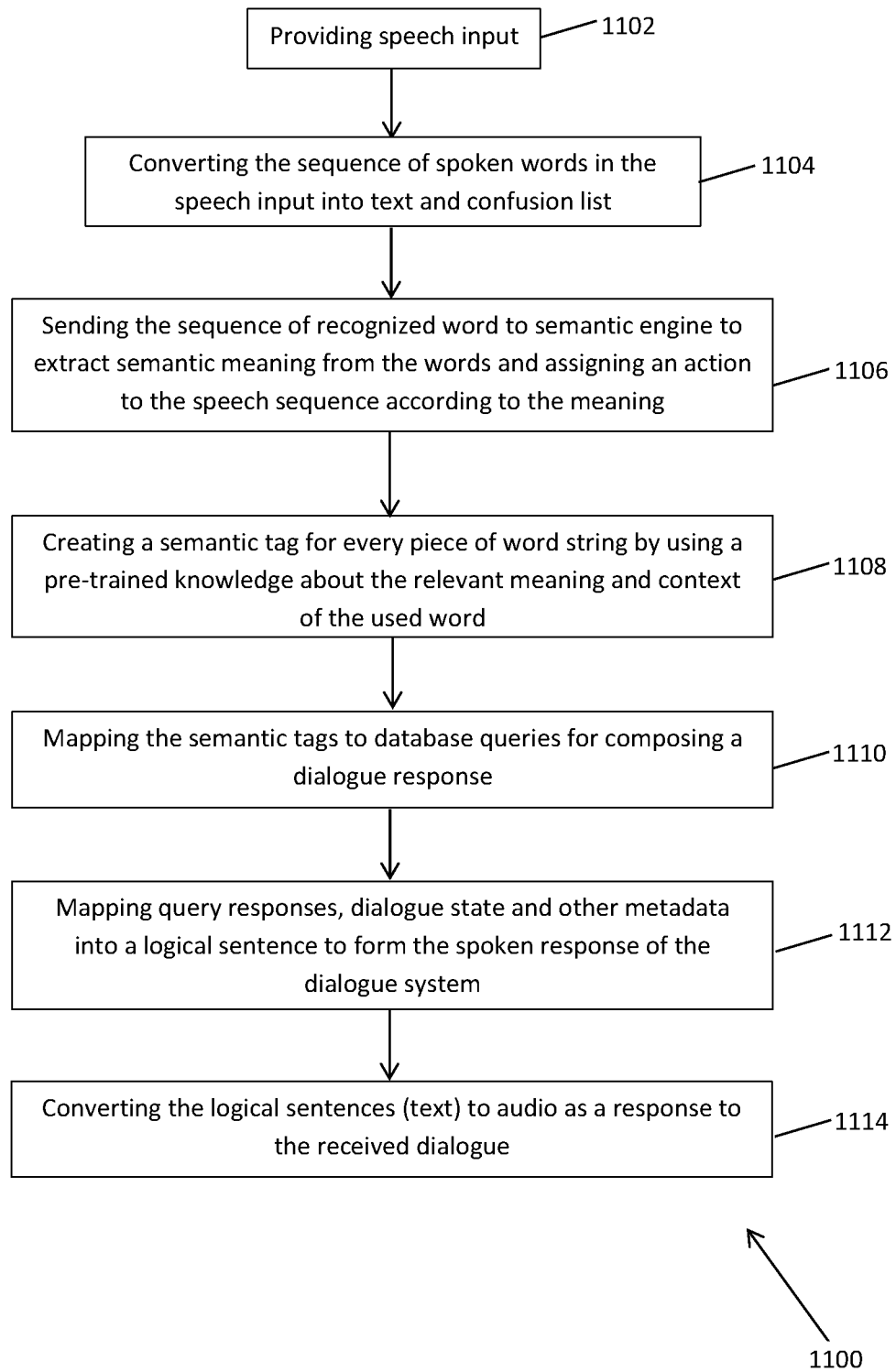
FIG. 11 illustrates a process diagram of the dialogue engine, in accordance with an embodiment of the present invention.

FIG. 11 illustrates a process diagram of the dialogue engine, in accordance with an embodiment of the present invention. In the process 1100, when an input speech is provided to the dialogue engine 100 at step 1102, the sequence of spoken words in the input speech are converted into text and confusion lists at step 1104, by the speech to text engine 102. Apart from this conversion, the dialogue engine 100 also captures language, accent, gender, age, emotion and the like entities from the input speech. The converted text along with the aforementioned entities are transferred to the semantic engine 104 that extracts semantic meaning from the words and assigns an action to the speech sequence according to the meaning with the help of the speech to semantic mapper 116 at step 1106.

When the end user sends a request, in the form of speech input, to the dialogue engine 100, the semantic engine 104 derives the possible meaning of the words at step 1106. The dialogue engine 100 uses all the historical information stored in the IVR application database 114A and the analytics database 114B in the context of the word while decoding the meaning of the input speech signal. Based on the meaning of the words, the semantic engine 104 understands the action required. At step 1108, semantic tags are then created for every piece of word string by using a pre-trained knowledge about the relevant meaning and context of the used word and passed to the query generator 106. The query generator 106 takes the semantic tags arising from the speech to text engine 102 and maps the semantic tags to database queries present in the IVR workflow logic module 108 that is necessary for composing a dialogue response, at step 1110. The IVR workflow logic module 108 is responsible for handling the special situations that may arise subsequent to the dialogue response. For an instance, if the end user says something that may result in abandoning the current query and starting a new one, or if too much information is available, and it cannot be presented in a simple dialogue, the information will be broken down and only important pieces are presented. This logic will be different from one application to another. The response is then fed to natural language generator 110 that maps the query responses, dialogue state and other age, gender and accent related metadata into a logical sentence to form the spoken response of the dialogue system, at step 1112. This stage could be purely handcrafted for small applications, or trained using a statistical or deep learning based NLG for larger applications. However the key aspect is that it accommodates metadata about the user age, gender and accent, to modify its own output. The examples of such modifications are generally hand-crafted, but just by hand-crafting a relatively small number of examples, the DNN NLG systems are able to generalize for different metadata scenarios. These logical sentences or texts are then converted into audio by the text to speech engine 112, at step 1114 and the audio is provided to the end user as a response to his request in the form of speech input, hence a real time transcription and response is provided.

The present invention has advantages over existing solution for speech recognition as it can be used for identification of various aspects of an end user over a call, including caller attributes such as gender, age, language, dialect and emotional state. The present invention provides performance improvement, over the conventional methods, in terms of computational time as well as accuracy of word understanding and corresponding response. The present invention can be implemented in commercial or industrial application, control and navigation, voice dialing, medical, military, aerospace, court reporting, home automation, hands free computation, automatic translation, mobile telephony, including mobile email, interactive voice response, speech-to-text reporter, telematics, multimodal interaction, transcription, robotics, video games and the like.

The invention claimed is:

1. A system for providing real-time transcripts of spoken text, the system comprising:
   a speech to text engine for converting an input speech of an end user into a text input, the text input comprises one or more sequences of recognized word strings or a word lattice in text form;
   a semantic engine to receive the text input for producing one or more transcripts using a language model and extracting semantic meanings for said one or more transcripts;
   wherein the semantic engine utilizes a grammar model and the language model to extract a meaning for said one or more transcripts;
   an age and an emotion identification subsystem that detects the age and emotional state of the end user, said age and emotion identification subsystem comprises an end to end LSTM-RNN based DNN classifier; said end to end classifier has two convolutional layers followed by two Network-in-Network (NIN) layers which performs the role of feature extraction from raw waveforms; the end to end DNN classifier has 2 LSTM layers after the feature extraction layers followed by a softmax layer;
wherein the end to end DNN classifier has no separate acoustic feature extraction module at signal processing level and raw speech frames obtained from end user's input speech waveform are directly presented to the input layer of the DNN.

2. The system of claim 1 further configured to identify and store additional metadata about the end user selected from the group consisting of age, gender, language, accent, and emotional state and search and verify the end user's identity.

3. The system of claim 1, wherein the semantic engine, on receiving the one or more sequences of recognized word strings or the word lattice, extracts semantic meaning from the one or more sequences of recognized word strings, or the word lattice, and associates that with one or more action tags and entities known to the system.

4. The system of claim 3, wherein the semantic engine further comprises a semantic mapper that is configured to label the one or more action tags by including multiple possible meanings of a word from the one or more sequences of recognized word strings in a particular context.

5. The system of claim 1, further comprising:
a query generator configured to map one or more action tags to one or more database queries present in an interactive workflow logic module, wherein the interactive workflow logic module handles situations arising subsequent to a dialogue response; and
a natural language generator trained to receive the mapped one or more action tags and additional metadata about the end user selected from the group consisting of age, gender, language, accent, and emotional state, wherein the mapped one or more action tags and the additional metadata are being mapped into one or more logical sentences to form a spoken response of the dialogue system in real-time.

6. The system of claim 1, wherein the system utilizes GRXML or JSGF or ABNF format grammars to learn one or more action tags and one or more transcripts of the semantic engine, and also to enhance a vocabulary based on the grammar model and a vocabulary based on the language model.

7. The system of claim 1 further comprising a language/accent recognition subsystem that extracts acoustic features from the input speech of the end user to identify the language and/or accent of the end user, wherein said language/accent recognition subsystem comprises:
a speech activity detection module to detect speech activity;
a shifted delta cepstral (SDC) module to compute cepstral mean and variance normalization of the input speech and to produce SDC feature vectors;
an I-vector extractor module to receive SDC feature vectors and to produce I-vectors using a deep neural network-universal background model (DNN-UBM); and
a logistic regression classifier module to receive and classify the I-vectors in order to identify the end user's language or accent.

8. The system of claim 1 wherein the system further comprises a speaker recognition (SR) subsystem that extracts acoustic features from the input speech of the end user to identify and verify the end user, said speaker recognition subsystem comprising:
a speech activity detection module to detect speech activity of the end user;
an MFCC computation module to calculate Mel Frequency Cepstral Coefficient along with cepstral mean and variance normalization of the speech activity and to generate feature vectors;
a keyword spotter module to provide keyword spotting based enrollment and verification of the end user;
a DNN-UBM based I-vector extractor module to produce I-vectors using a deep neural network-universal background model and a probabilistic linear discriminant analysis (PLDA) based classifier module to classify the identity of the end user.

9. The system of claim 1, wherein the age and emotion identification subsystem comprises a speech activity detection module to detect speech information and to generate an output for an MFCC computation module; wherein said MFCC computation module performs analysis of the acoustic features followed by cepstral mean and variance normalization of the input speech to identify the age and emotion of the end user;
a DNN-UBM based I-vector extractor to generate I-vectors for the identified acoustic features; and
a logistic regression classifier to classify the I-vectors to identify the end user's age and emotion.

10. The system of claim 1, wherein the emotion identification system provides provisions of both discrete and continuous classification of end user's emotional level; said discrete classification of end user's emotion comprises anger, happiness, anxiety, neutral, boredom and sadness; and the continuous classification of end user's emotion provides rating of emotional levels in two continuous scales called valence and arousal.

11. A method for providing real-time transcripts of spoken text, the method comprising:
converting, by a speech to text engine, an input speech of an end user into a text input, the text input comprising one or more sequences of recognized word strings and confusions in text form; and
receiving, by a semantic engine, the text input for producing one or more transcripts using a language model and extracting semantic meanings for said one or more transcripts;
wherein the semantic engine utilizes a grammar model and the language model to extract meaning for said one or more transcripts
detecting the age and emotional state of the end user by an age and emotion identification subsystem, comprising an end to end LSTM-RNN based DNN classifier; said end to end classifier has two convolutional layers followed by two Network-in-Network (NIN) layers which performs the role of feature extraction from raw waveforms; the end to end DNN classifier has 2 LSTM layers after the feature extraction layers followed by a softmax layer; and the end to end DNN classifier has no separate acoustic feature extraction module at signal processing level and raw speech frames obtained from end user's input speech waveform are directly presented to the input layer of the DNN.

12. The method of claim 11, further comprising identifying and storing additional metadata about the speaker, selected from the group consisting of age, gender, accent and emotional state of the end user.

13. The method of claim 11, wherein the one or more sequences of recognized word strings are assigned with one or more action tags and entities.

14. The method of claim 11 further comprising the step of extracting acoustic features from the input speech of the end user to identify language and/or accent of the end user.

15. The method of claim 11 further comprising the step of extracting acoustic features from the input speech of the end user to identify and verify the end user.

16. The method of claim 11 further comprising the step of extracting acoustic and pitch features from the input speech to identify the age and emotion of the end user.

* * * * *